Feb. 14, 1933.  F. E. TUTTLE ET AL  1,897,874

OPTICAL SYSTEM

Filed April 4, 1931

Fordyce E. Tuttle & Fred E. Altman,
Inventors

Patented Feb. 14, 1933

1,897,874

UNITED STATES PATENT OFFICE

FORDYCE E. TUTTLE AND FRED E. ALTMAN, OF ROCHESTER, NEW YORK, ASSIGNORS TO EASTMAN KODAK COMPANY, OF ROCHESTER, NEW YORK, A CORPORATION OF NEW YORK

OPTICAL SYSTEM

Application filed April 4, 1931. Serial No. 527,780.

This invention relates to optical systems, and more particularly to multiple image color photography.

In making pictures for color photography, it is desirable that the complementary images be taken simultaneously and from the same point of view, and that the images be of the same size and exactly positioned on the film.

It is an object of our invention to provide an optical system having an objective lens for each image which shall be focusable, and which shall have a depth of focus limited only by the black and white definition.

Another object of our invention is to provide an optical system for producing simultaneously two images of the same object field from the same viewpoint and in which the images are exactly registered on the film and are free from any defects caused by parallax or magnification differences.

Our invention contemplates the provision of an optical system in which a beam splitter is used to divide the light from the object field and direct the divided beams through objective lenses, which are so constructed as to compensate for the difference in the optical paths through the beam splitter.

Other objects and advantages of our invention will appear from the following description when read in connection with the accompanying drawing, and its scope will be pointed out in the appended claims.

Referring to the drawing—

Figure 1:
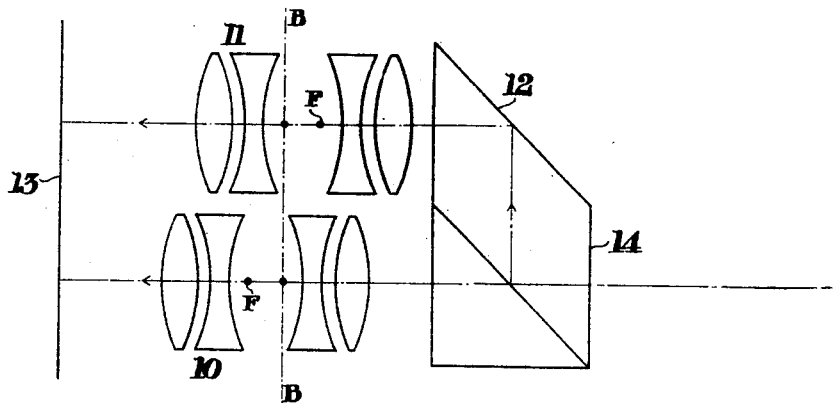
Figure 1 illustrates a combined lens and prism system embodying our invention.

In Figure 1, the objective 10 hereinafter called the direct lens is positioned to receive light from an object at an infinite distance transmitted directly through the beam splitter 12 and to image this object in the plane of the film 13. The objective 11 hereinafter referred to as the side lens is positioned to receive light divided and reflected by the beam splitter 12, and to image the object in the plane of the film 13. The direct lens and the side lens are then rigidly secured together and are movably mounted for focusing. They have the same equivalent focal length and, therefore for equal object distances their focal planes will coincide throughout the range of focus of the lenses and the images formed will be exact duplicates. By using the beam splitter it will be seen that the two images will be of the same object field and from the same point of view, and the two images will be in exact registration, by which we mean that the point of the object imaged on the axis of one lens will be imaged on the axis of the other lens.

If the two lenses 10 and 11 were identical, the images produced thereby would not be identical due to magnification differences caused by the difference in the optical paths through the beam splitter. This difficulty is overcome by so constructing the two lenses that the difference in the optical paths through the beam splitter is exactly compensated for and the resulting images do not suffer because of magnification differences.

Figure 2:
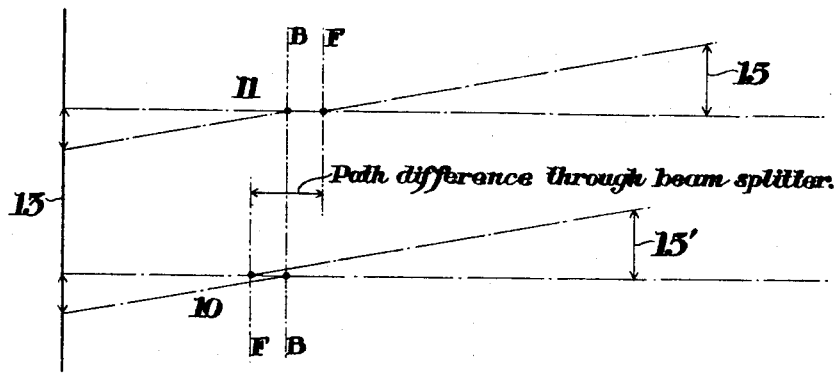
Figure 2 is a diagram illustrating how the path differences through the beam splitter are compensated for by properly positioning the Gauss planes of the objective lenses.

In Figure 2, we have diagrammatically shown the path of a ray of light from an object 15 through the lenses to the plane of the film 13. As is well known, a ray of light passing through the front Gauss point may be considered as entering the lens without diffraction, proceeding to the front Gauss point, and emerging in a parallel path from the back Gauss point, and it is because of this that the object distance used in lens formulæ is measured from the front Gauss point and the image distance from the back Gauss point. In the drawing the ray of light from the object 15 is shown as entering at the front Gauss point of the lens 11 and emerging from the back Gauss point to be imaged on the plane of the film 13. In this case the front Gauss point lies in front of the back Gauss point. However, the lens 10 has its front Gauss point behind its back Gauss point and consequently the object 15' is imaged on the plane of the film 13, and the two images would have a magnification difference if the optical paths between the object 15 and the lenses were the same. In using the beam splitter 12 the optical path of the light, which is directed to the lens 11 has an actual length greater than the light passing through the lens 10, and therefore, this difference in lengths of paths must be compensated for in order not to have magnification differences in their respective images. In accordance with our invention, this compensation is accomplished by separating the front Gauss planes of the two lenses by a distance equal to the difference in the optical paths of the light reaching the respective lenses.

The types of objectives mentioned are well known and the particular formulæ are immaterial. Other well known types of objective could be used. The adjustment of the position of the Gauss point by variation in the formula, particularly by changing the central separation, is well known to optical designers. Our invention consists in the choice of two objectives having the defined relative positions of their Gauss points and not in any particular formulæ.

It will be seen that an optical system constructed in accordance with our invention will give exact registration of images for all object distances, which images will be free from any magnification differences, as well as parallax, and the depth of focus of the system will be limited only by the black and white definition. This is true because the lenses are moved in assembly, their back Gauss planes are always the same distance from the plane of the film 13, and the optical distances of their front Gauss points from the face 14 of the beam splitter 12 are always equal.

It will be obvious to those familiar with this art that the optical system of our invention may be used for projection purposes where it is desired to superimpose a plurality of images in a single projection beam.

While we have illustrated and described in detail one embodiment of our invention, in order to comply with the statutes, we do not wish to be limited to the exact arrangement described inasmuch as, in view of the disclosure, obvious modifications will suggest themselves to those familiar with this art without departing from the spirit of our invention, or the scope of the claims herein.

What we claim as new, and desire to secure by Letters Patent of the U. S. is:

1. An optical system for producing on a film complemental images of an object field from the same point of view comprising a direct lens and a side lens, a beam splitter having a light dividing surface and reflecting surface in optical alinement with the direct and side lenses respectively, the said lenses having their back Gauss planes in the same plane and having their front Gauss planes separated by a distance equal to the difference of the light paths through the beam splitter.

2. An optical system for producing simultaneously in a single plane a plurality of images of the object field from accurately the same point of view, comprising a beam splitter having a front face and a light dividing surface and reflecting surfaces, a plurality of lenses in optical alinement with the beams of divided light transmitted by said beam splitter, said lenses being mounted rigidly together and having their back Gauss points the same distance from the image plane and having their front Gauss points the same optical distance from the face of said beam splitter.

3. An optical system for producing simultaneously in a single plane two images of an object field including two lenses of the same equivalent focal length positioned in optical paths of unequal length between the object field and the plane in which their respective images are formed, the algebraic difference of the separations of the Gauss planes of the two lenses being equal to the inequality of the two optical paths.

Signed at Rochester, New York, this 30th day of March, 1931.

FORDYCE E. TUTTLE.
FRED E. ALTMAN.